March 25, 1952  E. T. BOTH  2,590,294

TELEGRAPHIC FACSIMILE RECORDER

Filed April 28, 1949  4 Sheets-Sheet 2

Inventor
E. T. Both
By Glascock Downing & Kuhle Attys.

Inventor
E. T. Both

Patented Mar. 25, 1952

2,590,294

UNITED STATES PATENT OFFICE 2,590,294

TELEGRAPHIC FACSIMILE RECORDER

Edward Thomas Both, Cremorne, near Sydney, New South Wales, Australia, assignor to Automatic Totalisators Limited, Meadowbank, near Sydney, New South Wales, Australia, a company of New South Wales, Australia Application April 28, 1949, Serial No. 90,166
In Australia May 26, 1948

5 Claims. (Cl. 178—18)

This invention relates to telegraphic facsimile recorders and has for its object the provision of simple means whereby graphical matter committed to paper at one station (a transmitting station) may be accurately reproduced and re-committed to paper at one or more remote receiving stations. Although the invention is useful for the facsimile telegraphy of drawings, sketches or other graphic matter, it is particularly intended for the transmission and recording of hand-written messages.

According to the invention, at the transmitting station, two potentiometer windings are provided, each of which has a slidable contact associated therewith, as well understood. One of the potentiometer windings (herein called the vertical potentiometer) has its slidable contact carried on the free end of a lever fulcrumed at its other end. This lever has a "pen-carrier" rod pivotally connected thereto. The slidable contact for the second potentiometer winding (herein called the horizontal potentiometer) is mounted on the pen-carrier rod. At its free end, the pen-carrier rod has a stylus, pencil or other writing instrument (herein referred to as a "pen") mounted thereon. Alternatively, said free end of the carrier rod may be apertured to removably receive the writing tip of the "pen." The pen is conveniently positioned relative to a base board or the like upon which a piece of paper to be written on may be laid or positioned, as referred to later herein. When a written message is committed to the piece of paper by use of the pen, the horizontal movements of the pen (that is, in the direction of writing from one side of the paper to the other) result in the slidable contact for the horizontal potentiometer being similarly moved relative to the latter. In the same way, vertical movement of the pen is reproduced through the agency of the pen-carrier rod, and the lever to which it is connected, moving in sliding contact relative to the vertical potentiometer. The two potentiometers are connected in parallel with a suitable source of E. M. F. The voltage variations in the potentiometers, produced by the pen movements, are fed to each of one or more remote receiver units circuited with the potentiometer coils. If there is more than one receiving unit, then the several units are connected to the potentiometers in parallel.

The receiving station is provided with a writer arm carrying a pen or other marking instrument and, if necessary, an ink reservoir furnished with means for the slow feeding of ink to the pen. The writer arm is associated with a base board or the like upon which a piece of received message paper may be suitably emplaced. The writer arm is journaled on an upright support rod which at its lower end is universally pivotally supported in a footstep bearing. The support rod is linked to the armature of a "vertical" solenoid, which may be of the moving coil type, and is connected in series with the vertical potentiometer in the transmitting station, so that voltage variations in the vertical potentiometer reproduce similar variations of motion of the writer arm support rod. This support rod carries a crank which is coupled to the axially aligned armature elements of a pair of further moving coil solenoids ("horizontal" solenoids) which are connected in series with the horizontal potentiometer in the transmitting station, so that voltage variations in the horizontal potentiometer will impart corresponding rotary movement, to the writer arm support rod for horizontal traverse of the reproducing pen.

It will therefore be seen that a recorder, according to the subject invention, essentially comprises, at a transmitting station, means for producing voltage variations in dependence upon relative vertical and horizontal components of motion of a pen and, at a receiving station, a plurality of electro-magnetic means adapted to drive a reproducing pen in relative vertical and horizontal directions in response to differential energisation of said electro-magnetic means by said voltage variations.

The foregoing, together with other features of the present invention, will be more readily understood after reading the following description in conjunction with the accompanying drawings which depict one practical embodiment of said invention by way of example.

In those drawings—

Figure 8 is an enlarged elevational view of the writer arm support rod of Figures 6 and 7.

Figure 9 is a transverse section on line IX—IX of Figure 8 and

Figure 10 is an enlarged sectional detail of the writing end of the writer arm.

Figure 1:
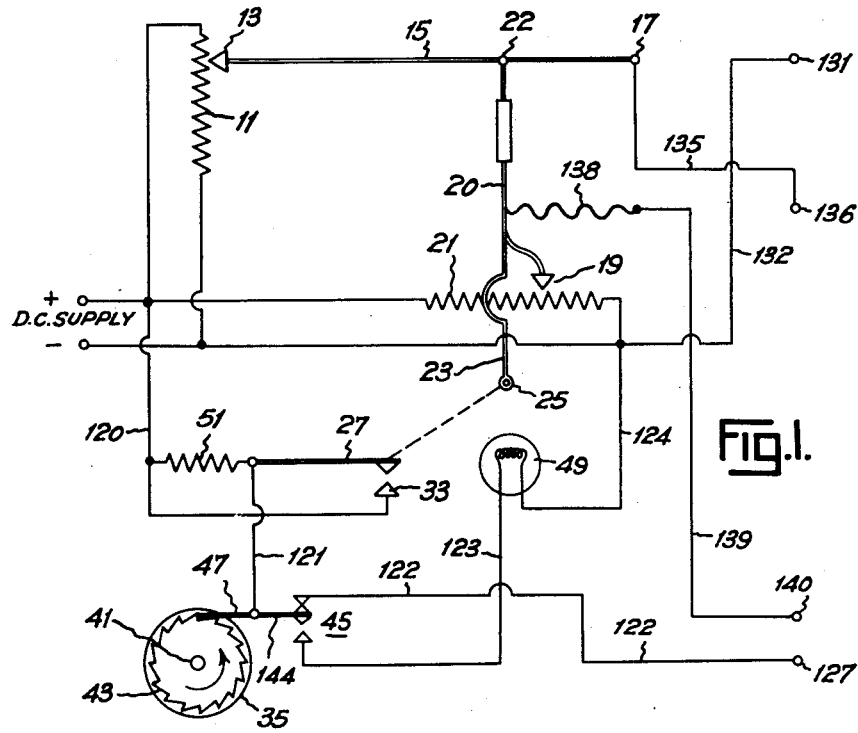
Figures 1 and 2 are circuit diagrams of a transmitting station and a receiving station, respectively, in a facsimile recorder system of the invention.
Figure 3:
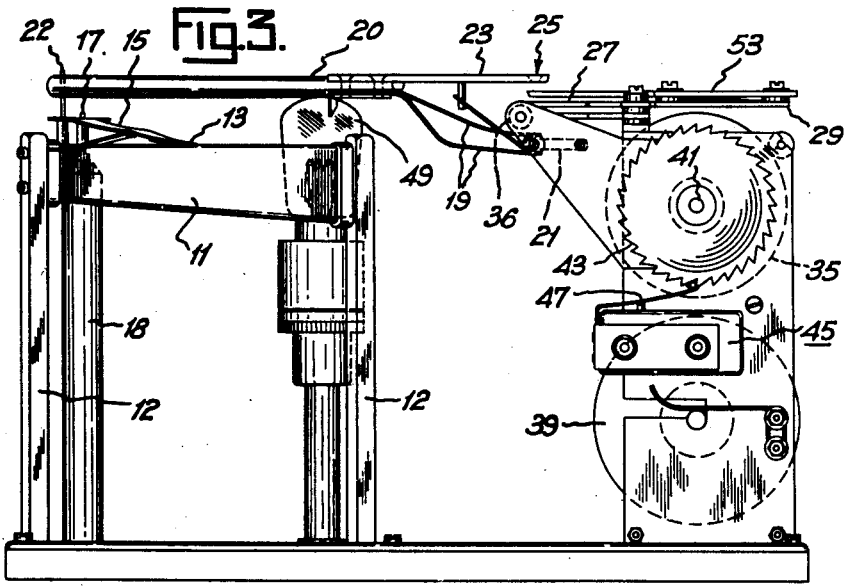
Figure 3 is a side elevation.
Figure 4:
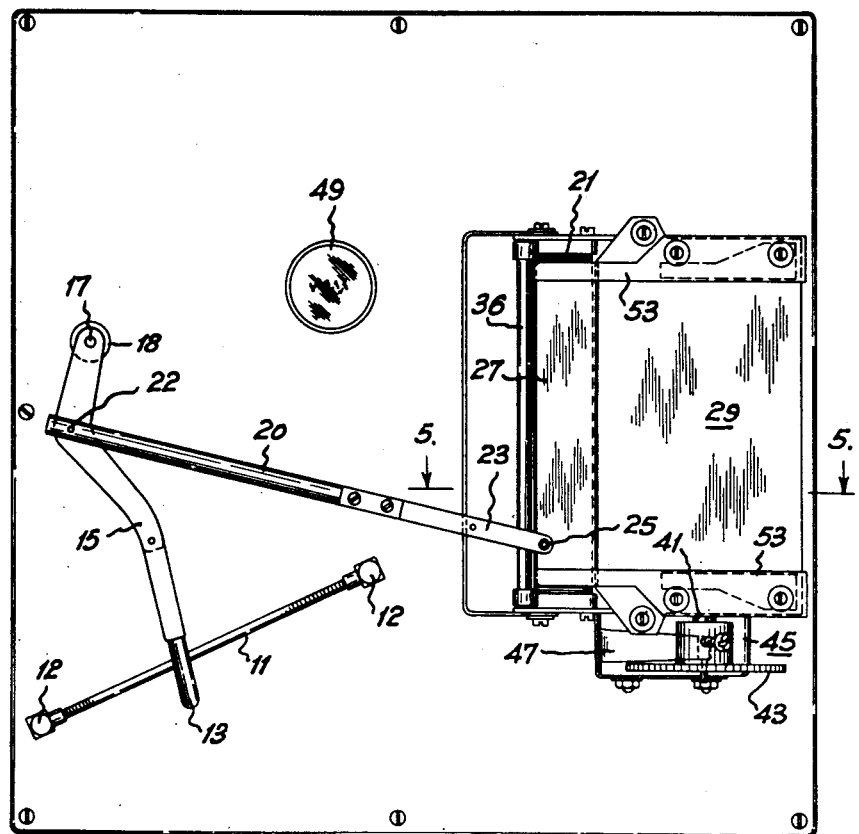
Figure 4 is a plan view of the transmitting unit.
Figure 5:
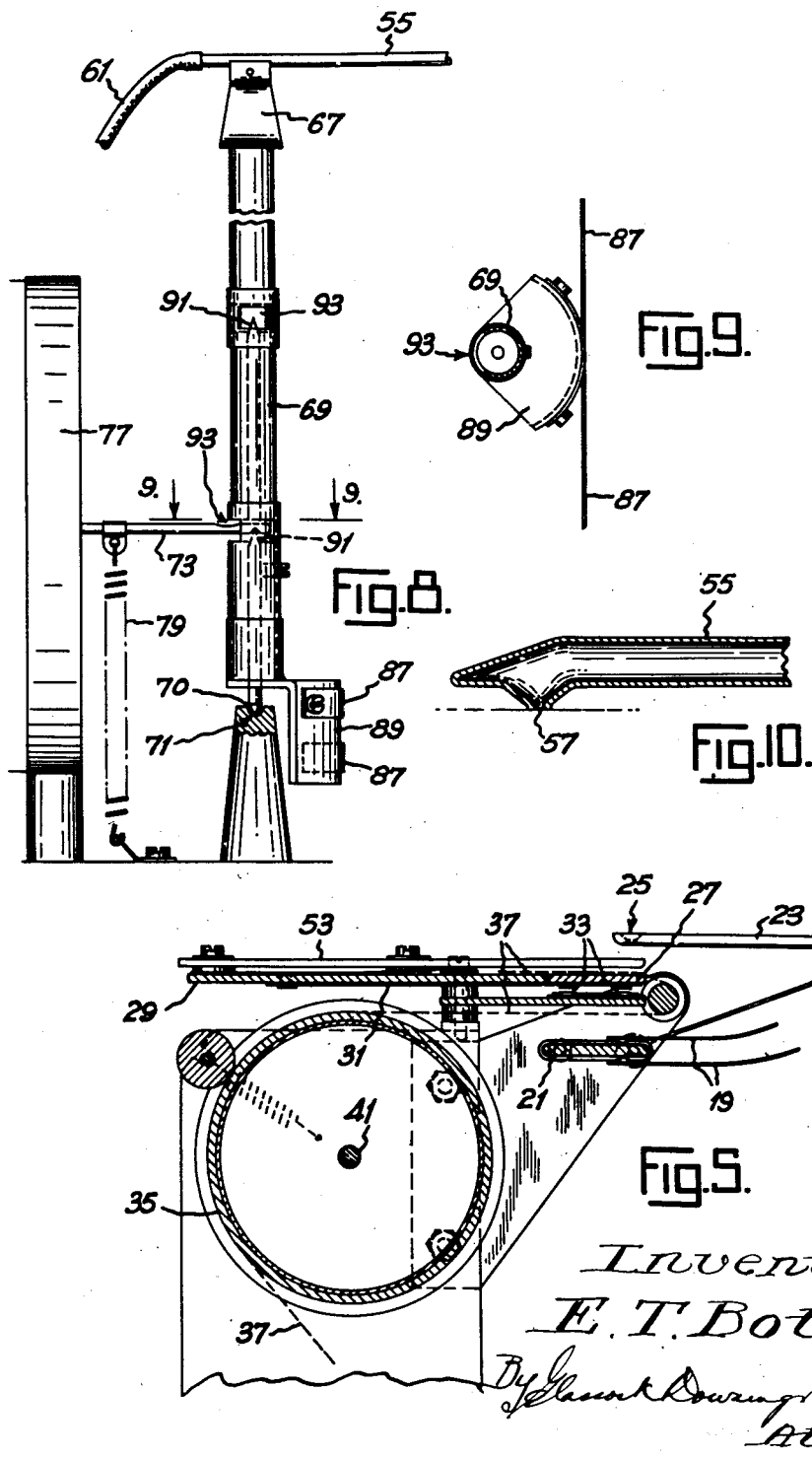
Figure 5 is an enlarged sectional detail taken on line V—V of Figure 4.

Referring first to Figures 1, 3, 4 and 5, it will be seen that a transmitting unit embodying the present invention includes a vertical potentiometer 11 mounted on posts 12 and having a sliding contact 13 carried by the free end of a lever 15 fulcrumed at 17 to the upper end of pillar 18.

The contacts 19 of horizontal potentiometer 21 are outrigged from an insulated arm 20 pivoted at 22 to lever 15, the said arm 20 being extended to provide a pen carrier rod 23 having a terminal socket or aperture 25 to receive the writing point of a pen.

The socket 25 is movably located above a depressible contact plate 27 which constitutes an extension of table 29, said contact plate being mounted on the free ends of spring arms 31 for co-action with fixed contacts 33.

35 is a feed roll for a paper strip (indicated in Figure 5 by the dotted line 37) said roll being interposed between a magazine spool 39 and the table 29.

On one end of the shaft 41 of the roll 35 there is fixed a ratchet wheel 43 of which the teeth are adapted to actuate a microswitch 45 through the medium of arm 47 while, in circuit with the normally open lower contacts of switch 45, there is an indicator lamp 49 for a purpose to be later described. 51 is a load resistor, in circuit with the winding of receiver magnet 97, and adapted to hold armature 105 until the circuit of magnet 97 is broken by switch 45.

The paper strip 37 is led over table 29 and contact plate 27 by means of the overhanging guide members 53.

Figure 2:
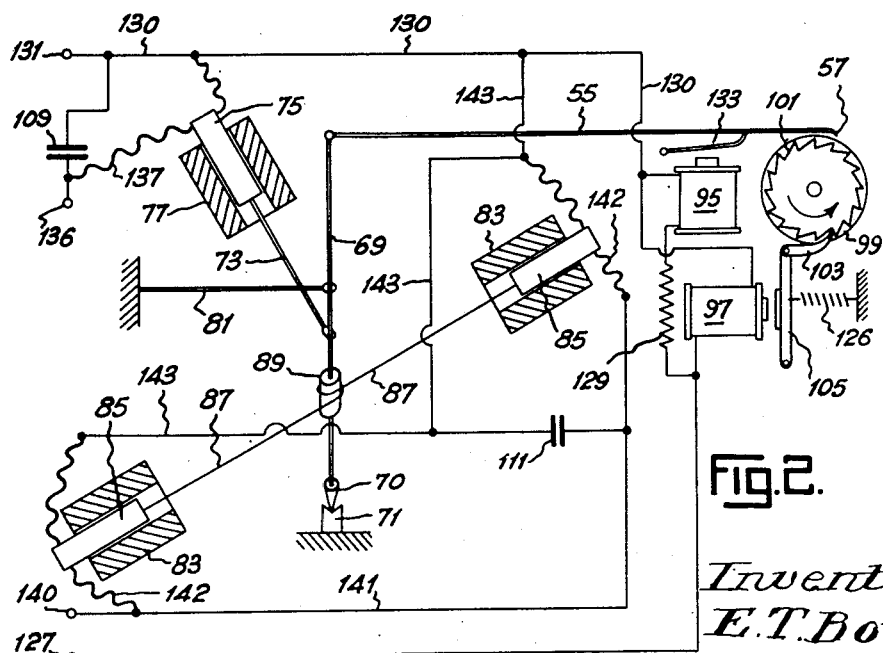
Figure 6:
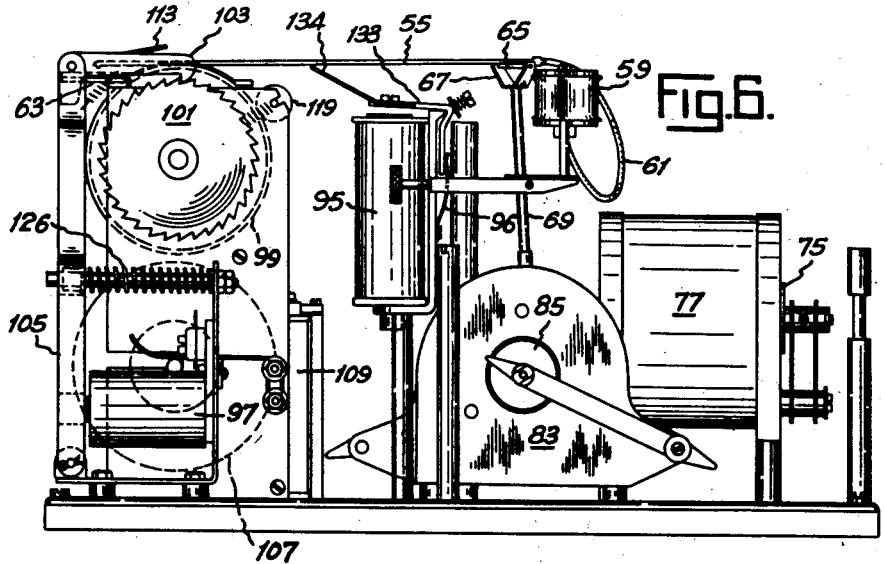
Figure 6 is a side elevation.
Figure 7:
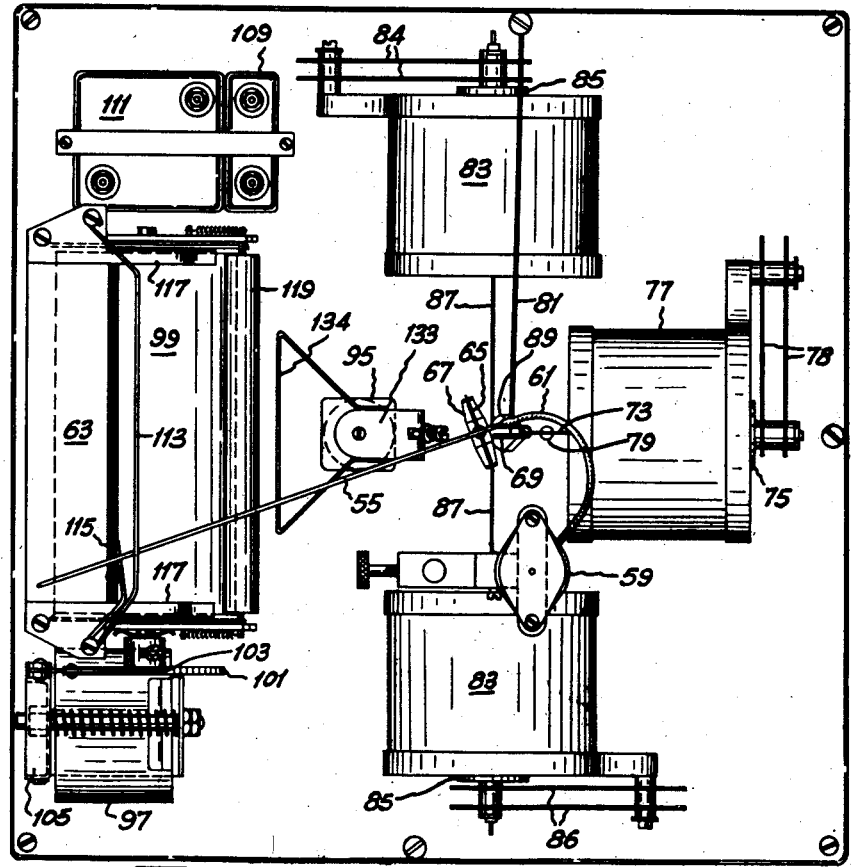
Figure 7 is a plan view of a receiving unit.

Turning now to the receiving end of the equipment, reference will be made to Figures 2, and 6–10 inclusive of the accompanying drawings.

The receiver includes a tubular writer arm 55 having, near its free end, a downturned ink delivery nipple 57 (see Figure 10), the other end of said writer arm being coupled to an ink reservoir 59 by means of a flexible tube 61.

The said free end of the writer arm 55 is movably disposed above a writing table 63 while said other end of said arm has attached thereto the transversely disposed journal bar 65 having pointed ends journaled in a bracket 67 heading a support rod 69 having a cone pointed lower end 70 seated for universal movement in footstep bearing 71.

To impart "vertical" movement to the writer arm 55 the support rod therefor is coupled, by means of link 73, to moving coil 75 of "vertical" solenoid 77, a coil spring 79 being provided between link 73 and frame to keep the cone point 70 seated in bearing 71, and the support rod 69 being restrained against lateral movement by means of tie rod 81.

"Horizontal" motion of the writer arm is obtained by means of the push-pull "horizontal" solenoids 83, the respective moving coils 85 of which are coupled by means of straps 87 to a crank sector 89 radially extending from support rod 69.

As indicated by Figure 8, the link 73 and tie rod 81 are rotatably coupled with support rod 69 by means of needle points 91 centrally located within rod 69 opposite transverse openings 93, the coacting ends of link 73 and tie rod 81 being formed with complementary seatings for such needle points.

78 and 84, 86 are energising springs for the moving coils of solenoids 77 and 83 respectively; 95 is a lowering relay for the writer arm 55; 97 is an electromagnet which operates paper feed roll 99 via ratchet wheel 101, hooked pawl 103 and armature 105; 107 is a paper strip magazine spool; 109 and 111 are condensers; 113 is a "keeper" yoke for the writer arm 55; 115 is a lift ramp for the writer arm; 117 are guides for the paper strip when passing over table 63; 119 is a pressure roll to prevent the paper strip from slipping in relation to feed roll 99.

*Operation of the recorder equipment*

With paper from spool 39 threaded over feed roll 35, guide roll 36, contact plate 27 and table 29 a pen point is inserted through socket 25 at the free end of insulated arm 20 and moved into "writing commence" position over contact plate 27. Pressure of the pen point on the paper above plate 27 will depress plate 27 to close contacts 27, 33 to complete a circuit to relay 95 from the positive side of the D. C. supply via lead 120, contacts 33, plate 27, lead 121, the arm 144 of microswitch 45 and the normally closed upper contacts thereof, lead 122, terminals 127, lead 128, resistor 129, the winding of relay 95, lead 130, terminals 131 and lead 132 to the negative side of D. C. supply.

This circuit energises relay 95 to overcome the tension of the biasing spring 96 of its armature 133 thereby to lower the lifting frame 134 which, during non-operative periods, raises the writer arm into contact with keeper 113.

Closure of contacts 27, 33 also short-circuits resistor 51 thereby applying full voltage to the windings of electro-magnet 97 which is connected in the last mentioned circuit in parallel across the series-connected resistor 129 and relay 95. Application of full voltage to the windings of electro-magnet 97 to attract its armature 105 and resistor 51 is of such value that, when contacts 27, 33 are subsequently opened, sufficient voltage will still flow through the windings of electro-magnet 97 to hold its armature 105 fully attracted.

Lowering of the lifting frame 134 allows the writer arm nipple 57 to drop into contact with the message paper on table 63, following which, relative vertical and horizontal components of movement of the pen point in socket 25 at the transmitter will be converted into voltage variations by potentiometers 11, 21 and such voltage variations will be applied solenoids 77, 83 respectively to drive the writer arm 55 and cause the nipple 57 thereon to reproduce the motion of the pen is socket 25.

Voltage variations from vertical potentiometer 11 are applied to solenoid 77 via lead 135, terminals 136 and pigtail 137 to return via common negative lead 130, terminals 131 and lead 132, while voltage variations from horizontal potentiometer 21 are applied to solenoids 83 in parallel via pigtail 138, lead 139, terminals 140, lead 141, pigtails 142 to return via lead 143, common negative lead 130, terminals 131 and lead 132.

Solenoid 77 is shunted by condenser 109 and solenoids 83 are each shunted by the condenser 111.

When the transmission pen is lifted from the paper strip 37, contacts 27, 33 open and the relay 95 is de-energised so that the loading spring 96 associated with the armature 133 causes the latter, through the medium of frame 134, to lift the writer arm 55 into contact with keeper 113. When the transmission pen is again put to paper and the contacts 27, 33 closed, the relay 95 is re-energised again to lower the receiver pen.

It will be appreciated that the vertical solenoid 77 may be designed to move the receiver pen sufficient for the writing of a message of any selected number of lines, but, for preference, the vertical motion is limited to that which is necessary for the writing of a single line of message, and means are therefore incorporated for step-by-step feed of the message strip at the receiver in synchronism with feed motion imparted to the paper strip 37 at the transmitter. To this end, when the paper strip 37, at the transmitter, is manually pulled over table 29, feed roll 35 is rotated with consequent rotation of ratchet wheel 43. Each time the micro-switch actuating arm 47 is depressed, after closure of contacts 27, 33, by a tooth on ratchet wheel 43, the switch arm 144 of micro-switch 45 opens the normally closed upper contacts of said switch and closes the normally open lower contacts thereof momentarily to illuminate lamp 49 and thereby to indicate that the switch 45 is not completing a "writing" circuit to the receiver.

Each closure of the lower contacts of microswitch 45, with consequent de-energisation of electro-magnet 97, also causes the spring 126 to return the armature 105 to non-attracted position, during which return movement the hooked pawl 103 rotates the rachet wheel 101 one step, thereby correspondingly rotating the feed roll 99 and thus feeding the message strip at the receiver to the same extent that the paper strip 37 at the transmitter was moved as mentioned above.

If it is desired to advance the receiver message strip more than the one step mentioned above, and without performing any intervening writing operation at the transmitter, it will be necessary manually to depress plate 27 to close onto contacts 33 before each one-step rotation of ratchet wheel 43 so that armature 105 will be fully attracted before the circuit to windings 97 is broken at switch 45 to enable spring 126 to operate pawl 103 as above described.

The wire ramp element 115 is upwardly and outwardly inclined from table 63 and functions automatically to lift the writer nipple 57 out of contact with the message strip at the end of each written line irrespective of energisation of writer arm dropping relay 95. In any event the moving coils 85 of solenoids 83 are biased by springs 84 so that, when the apparatus is idle, the writer arm will assume the position shown in Figure 7 of the drawing, i. e., the writer arm will always be mechanically supported by ramp element 115 when at rest.

I claim:

1. In a facsimile recording system including, at a transmitting station, a pair of parallel-connected potentiometers arranged and adapted to convert relative horizontal and vertical components of motion of a pen into equivalent voltage variations, and, at a receiving station, a plurality of moving-coil solenoids arranged and adapted to drive a reproducing pen in relative horizontal and vertical directions in response to differential energisation of said solenoids by said voltage variations; the construction wherein said reproducing pen comprises a tubular writer arm and a support rod therefor, one end of said writer arm being provided with a downwardly directed ink delivery nozzle, means for connecting the other end of said writer arm to an ink reservoir, means at said other end of said writer arm for pivotally connecting the latter to the upper end of said support rod, and means for universally, pivotally supporting the lower end of said support rod.

2. In a facsimile recording system including, at a transmitting station, a pair of parallel-connected potentiometers arranged and adapted to convert relative horizontal and vertical components of motion of a pen into equivalent voltage variations, and, at a receiving station, a plurality of moving-coil solenoids arranged and adapted to drive a reproducing pen in relative horizontal and vertical directions in response to differential energisation of said solenoids by said voltage variations; the construction wherein said reproducing pen comprises a tubular writer arm and a support rod therefor, one end of said writer arm being provided with a downwardly directed ink delivery nozzle, means for connecting the other end of said writer arm to an ink reservoir, means at said other end of said writer arm for pivotally connecting the latter to the upper end of said support rod, means for pivotally seating the lower end of said support rod, means for linking said support rod to one of said solenoids whereby movement of the coil of said one solenoid imparts radial motion to said rod about its pivotal seating, and means for linking said support rod to two further ones of said solenoids whereby movement of the coils of said further solenoids imparts rotary motion to said support rod about its longitudinal axis.

3. In a facsimile recording system including, at a transmitting station, a pair of parallel-connected potentiometers arranged and adapted to convert relative horizontal and vertical components of motion of a pen into equivalent voltage variations, and, at a receiving station, a plurality of moving-coil solenoids arranged and adapted to drive a reproducing pen in relative horizontal and vertical directions in response to differential energisation of said solenoids by said voltage variations; the construction wherein said reproducing pen comprises a tubular writer arm and a support rod therefor, one end of said writer arm being provided with a downwardly directed ink delivery nozzle, means for connecting the other end of said writer arm to an ink reservoir, a U-shaped bracket secured to the upper end of said support rod, a transversely disposed journal bar secured to said upper end of said writer arm, said journal bar being journalled in the limbs of said bracket, means for pivotally seating the lower end of said support rod, means for linking said support rod to one of said solenoids whereby movement of the coil of said one solenoid imparts radial motion to said support rod about its pivotal seating, a crank sector radially extending from said support rod, and flexible means for linking said crank sector with two further ones of said solenoids whereby movement of the coils of said further solenoids imparts rotary motion to said support rod about its longitudinal axis.

4. The invention according to claim 2 including a tie rod connected to said support rod and adapted to confine said radial motion of said support rod to a single plane.

5. The invention according to claim 3 including a tie rod connected to said support rod and adapted to confine said radial motion of said support rod to a single plane.

EDWARD THOMAS BOTH.

REFERENCES CITED

The following references are of record in the file of this patent:

UNITED STATES PATENTS

| Number | Name | Date |
|---|---|---|
| 494,562 | Gray | Apr. 4, 1893 |
| 924,512 | Tiffany | June 8, 1909 |
| 1,322,372 | Tiffany | Nov. 18, 1919 |
| 2,516,092 | Roessler | July 18, 1950 |